United States Patent
Huber (10) Patent No.: US 9,216,786 B1
(45) Date of Patent: Dec. 22, 2015

(54) TRANSPORTATION CYCLE WITH BALL SEAT

(71) Applicant: Aaron D. Huber, Louisville, OH (US)

(72) Inventor: Aaron D. Huber, Louisville, OH (US)

(73) Assignee: CORDIO, LLC, Akron, OH (US)

(*) Notice: Subject to any disclaimer, the term of this patent is extended or adjusted under 35 U.S.C. 154(b) by 0 days.

(21) Appl. No.: 13/835,118

(22) Filed: Mar. 15, 2013

Related U.S. Application Data (63) Continuation-in-part of application No. 13/132,178, filed on Jun. 1, 2011, now Pat. No. 9,079,067.

(51) Int. Cl.
*B62K 5/02* (2013.01)
*B62J 1/00* (2006.01)
*B62K 5/003* (2013.01)

(52) U.S. Cl.
CPC . *B62J 1/00* (2013.01); *B62K 5/003* (2013.01); *B62K 5/02* (2013.01)

(58) Field of Classification Search
CPC .............. B62J 1/00; B62K 5/003; B62K 5/02
USPC ......... 280/288.1, 220, 288.4; 297/195.1, 214, 297/452.41
See application file for complete search history.

(56) References Cited

U.S. PATENT DOCUMENTS

| | | | | |
|---|---|---|---|---|
| 5,143,390 A | * | 9/1992 | Goldsmith | 280/201 |
| 5,244,251 A | * | 9/1993 | Bourla | 297/199 |
| 5,419,612 A | * | 5/1995 | Rassekhi | 297/200 |
| 5,690,389 A | * | 11/1997 | Ekman et al. | 297/452.41 |
| 6,012,772 A | * | 1/2000 | Conde et al. | 297/219.11 |
| 6,203,043 B1 | * | 3/2001 | Lehman | 280/288.1 |
| 6,601,922 B2 | * | 8/2003 | Doolan et al. | 297/466 |
| 6,886,202 B2 | * | 5/2005 | Frechette | 5/654 |
| 7,114,783 B2 | * | 10/2006 | Warren et al. | 297/452.41 |
| 7,448,676 B2 | * | 11/2008 | Wyner et al. | 297/200 |
| 7,635,161 B2 | * | 12/2009 | Donaghey | 297/199 |
| D625,370 S | * | 10/2010 | Huber et al. | D21/662 |
| 7,828,378 B2 | * | 11/2010 | Donaghey | 297/200 |
| D637,245 S | * | 5/2011 | Huber et al. | D21/667 |
| D679,916 S | * | 4/2013 | Barney et al. | D6/366 |
| 8,469,369 B1 | * | 6/2013 | McCarthy et al. | 280/1.14 |
| 2008/0224506 A1 | * | 9/2008 | Donaghey | 297/199 |

* cited by examiner

*Primary Examiner* — Kevin Hurley
*Assistant Examiner* — Marlon Arce
(74) *Attorney, Agent, or Firm* — John D. Gugliotta (57) ABSTRACT

An transportation cycling apparatus is provided having an inflatable seat securely retained by a seat retaining mechanism. The inflatable seat is spherical in shape and made of polymers to actively support a user. The cycling apparatus further having a frame, handlebars, brakes, pedal assembly and a sprocket and chain powering mechanism. The cycling apparatus can take the form of either a two-wheeled bicycle or a three-wheeled tricycle.

7 Claims, 9 Drawing Sheets

TRANSPORTATION CYCLE WITH BALL SEAT

RELATED APPLICATIONS

The present application is a Continuation in Part of U.S. Ser. No. 13/132,178, filed on Mar. 17, 2010, which claimed the benefit of Provisional Application No. 61/216,599, filed on May 18, 2009.

BACKGROUND OF THE INVENTION

1. Field of the Invention

The present invention relates generally to transportation bicycles and tricycles and, more specifically, to bicycles and tricycles which use an inflatable seat to provide improved comfort, absorb vibration and shock, and to allow for the physically superior bio-mechanical ability to have more natural hip and upper leg mobility during pedaling and can help provide a more dynamic core muscle strengthening exercise (both In large muscle groups as well as important smaller, less noticeable stabilizing muscles) that aid in improving such daily functions as a person's balance, posture, bending, reaching and other needed movements.

2. Description of the Related Art

As recently as 1965, world production of cars and bikes was essentially the same, with each at nearly 20 million. However, as of 2003 bike production had climbed to over 100 million per year compared with 42 million cars. Bicycle production was 105 million units globally in 2004, a 1.5% increase over 2003 (WorldWatch Institute).

Key to a bicycle's performance is the fit and comfort with which it integrates with the rider. A key element that can have the greatest impact on this comfort, and therefore performance, is the seat or saddle element. Saddles can be specific for men and women, and come in various designs to fit various body shapes and riding styles. For the most part, the saddle can feature a raised, padded area that distributes weight evenly across the rider's seat bones and muscles. This distribution of weight can be the most important aspect of the fit.

If the saddle is too narrow, excessive pressure can cause numbness and discomfort. If the saddle is too wide, chaffing can occur. These size fluctuations of saddles have led the medical community to link saddle sizes to medical complications resulting in rashes, prostate problems, inflammation and other conditions.

Further, saddle adaptations are available for different types of bikes, with a racing bike requiring a different saddle than a cruiser due to the posture of the rider and the method of use, i.e. speed versus leisure. And in the bicycle sales industry it is common for customers to ask for a more comfortable and supportive bicycle seat.

There are also female specific saddles which may have a wider seat area, shorter nose, and center relief. Other saddles are adapted with more cushion for additional comfort and are provided with a somewhat broad nose, and a wide cushioned seat. While being heavier than most bicycle seats due to its size and the use of springs underneath for a smooth, firm ride, such seats are made for a leisurely ride, albeit at the expense of making it more difficult to pedal fast as typical of a racing bike and narrow saddle. Other varieties are known as "gel seats" in which the padding is replaced by or includes a soft gel cushion.

Inflatable balls provide excellent support. Based on the nature of a ball acting as a seat, a person can have their upper thighs, hamstrings, hips, and lower back supported and encouraged to move in a natural rhythmic motion that human bodies are intended to move. This further provides a more unrestricted movement that is currently created by conventional bicycle seating.

Additional comfort also allows for longer sustained periods of sitting on and using a transportation cycle (as contrasted with a stationary type cycle). The seat shown in this patent will have the ability to engage and strengthen the rider's core muscles, thus creating more benefits and allowing a more multi-faceted exercise experience when using this ball-seat cycle as opposed to a traditional or current cycle and seat. Comfort will also be a major benefit to this seat shown.

Consequently, a need exists for improvements in comfort, performance and shock absorption for bicycle and tricycle saddles. This need is solved by the present invention of a cycle having a ball as a seat.

SUMMARY OF THE INVENTION

It is therefore an object of the present invention to provide an improved transportation cycle.

It is a feature of the present invention to provide an improved transportation cycle having an inflatable ball as a seat to provide improved comfort and absorption of vibration and shock.

Briefly described according to one embodiment of the present invention, an improved transportation cycle having a geometric inflatable seat to provide support and create additional core strengthening movements for the cycle rider.

In accordance with a preferred embodiment, a frame assembly defines an area into which the inflatable seat releasably mates and is rendered relatively stationary within the frame assembly.

Another preferred embodiment of the present invention is to provide a conventional transportation cycle having otherwise conventional components, in combination with a geometric inflatable seat providing support and comfort.

An advantage of the present invention is that a cycle rider will work more core muscle groups because of the specific shape and nature of motion offered of the inflatable ball seat.

Another advantage of the present invention is that improved cycle having an inflatable seat will be lighter than a traditional cycle because the seat element of a conventional cycle has been eliminated.

Further, a preferred embodiment of the present invention is a child's tricycle defining a receiving area capable of having a removable and inflatable geometric seat inserted and retained by the receiving area.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

An exemplary version of a best mode for carrying out the invention is presented in terms of its preferred embodiment, herein depicted within FIGS. 1-8. However, the invention is not limited to the described embodiment and a person skilled in the art will appreciate that many other embodiments of the invention are possible without deviating from the basic concept of the invention, and that any such work around will also fall under the scope of this invention. It is envisioned that other styles and configurations of the present invention can be easily incorporated into the teachings of the present invention, and the configurations shown and described herein are for purposes of clarity and disclosure and not by way of limitation of scope.

The terms "a" and "an" herein do not denote a limitation of quantity, but rather denote the presence of at least one of the referenced items.

The term "or" herein is to be interpreted inclusively not exclusively.

Unless stated otherwise, the term "or" means "either or both."

As used for purposes of the present invention, the term "ball" is to be broadly construed as a round, spherical, ovoid, or hemispherical resilient object that is pneumatically, hydraulically or otherwise pressurized from within.

As used for purposes of the present invention, the term "bicycle" or "bike" herein refers to a conventional two-wheeled bicycle that may be of any known variety, by way of example and not limitations, a mountain bike or a racing road bike. For purposes of the present invention, it is to be interpreted broadly to include any type of transportation cycle such as, for example, a "tricycle" or "trike" or "quad". The term "cycle" herein is intended to specifically exclude stationary type exercise cycles. "Tricycle" or "trike" commonly refers to a three-wheeled tricycle that may be of any known variety, by way of example and not a limitation, a toy tricycle for children, or an adult road tricycle. A "tricycle" or "trike" can have two wheels in the rearward location and one wheel in the front, commonly known as a "delta" configuration or style. Additionally, a "tricycle" or "trike" may also be in reverse order and have one wheel in the rearward area of the cycle's frame and two wheels in the front, sometimes referred to as a "tadpole" style cycle. The "tadpole" style cycle often utilize a different steering mechanism system than does the "delta" style configuration, but is still capable of accommodating the ball seat cycle of the present invention. The term "quad" herein refers to a four-wheeled cycle that may be of any known variety, by way of example and not a limitation, an All-Terrain Vehicle (ATV), a golf cart style, or a man-powered, motorized or mechanized four-wheeled transportation cycle. It is to be understood that the use of "bicycle", "bike" or "cycle" throughout the present invention is intended to include any of these variations interchangeably and as an equivalent.

The terms "pneumatic" or "inflatable" are herein used interchangeably and related to the ball seat of the present invention, its ability to be enlarged and filled by air, and its ability to retain viable, sound, safe, durable, and flexible shape and form.

The term "chain" herein refers to any known conventional cycle chain, or its substantial equivalent, by way of example and not a limitation, a drive belt of any known material.

The term "pedal" or "pedals" herein refers to any surface for a person's feet to be placed upon for pedaling and creating power to drive the cycle substantially as described herein, and including elliptical or linear motion as well as rotational motion systems.

The best mode for carrying out the invention is presented in terms of its preferred embodiment, herein depicted within the Figures.

1. Detailed Description of the Figures

Figure 1:
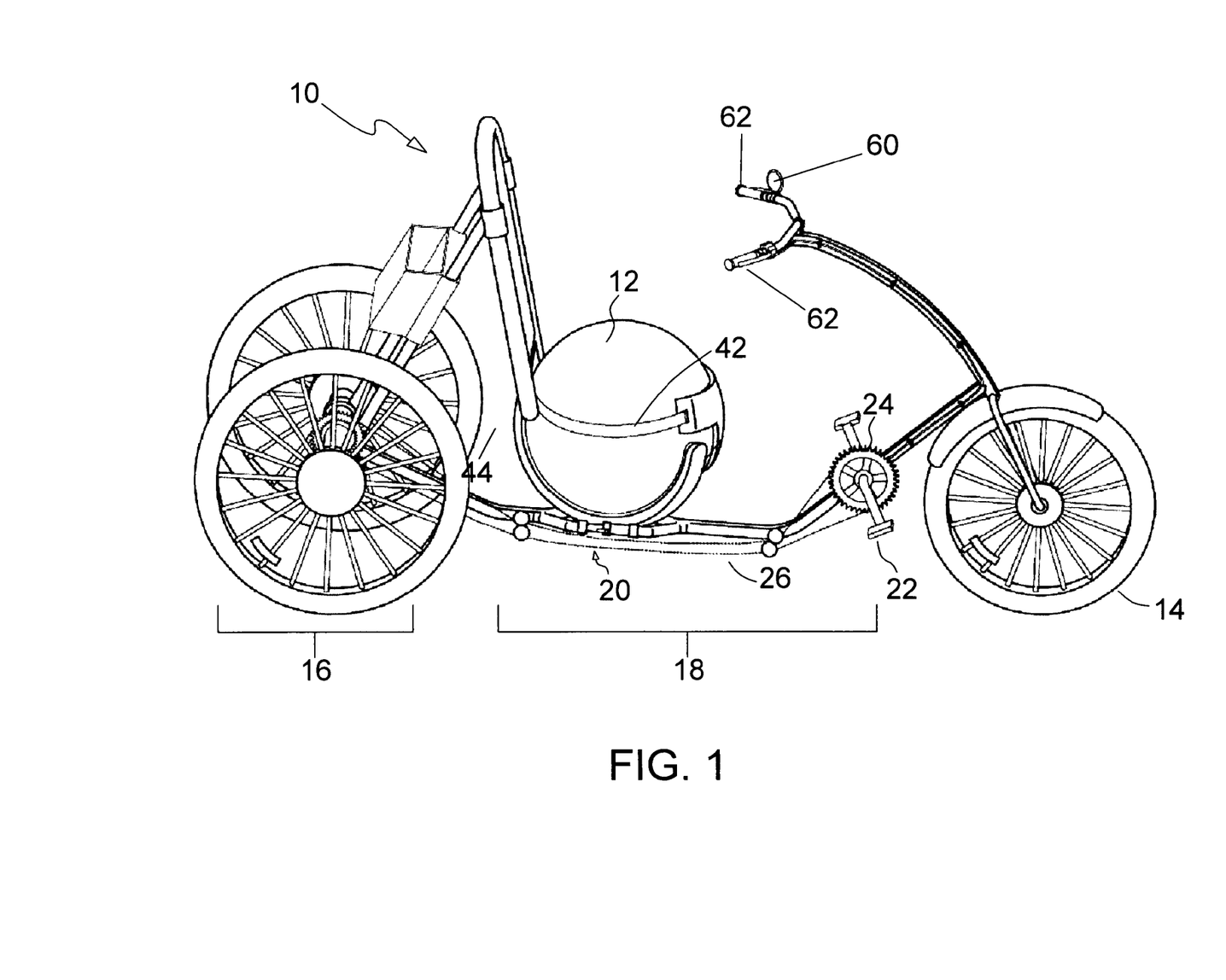
FIG. 1 is a perspective view of a first embodiment of a tricycle having the pneumatic seat element according to the preferred embodiment of the present invention.

Referring now to FIG. 1, a first embodiment of a transportation cycle, shown generally as 10, and having a pneumatic or inflatable seating element 12 as described in greater detail herein. The cycle or bike 10 is shown anticipated as adapted for use with the seating element 12 of the present invention, and is shown having a front wheel 14 opposite a rear wheel 16 and connected by an elongated frame member 18 adapted for connection to and support of the seating element 12 and a seat retaining mechanism 20. An alternative embodiment having a pneumatic seating element as described in greater detail herein is a tricycle or trike. The trike is anticipated as being used by a child or adult and either a toy or transportation means, but adult variations are anticipated. The trike having exactly three wheels in combination with and connected to a trike frame and inflatable seat. A further alternate embodiment having an inflatable seat as described in greater detail herein is a "quad" having four wheels.

As should be apparent to one having ordinary skill in the relevant art, in light of the present invention, the design and configuration of the transportation cycle as shown and described herein can be modified in various ways in order to incorporate various other features known for use with otherwise conventional trikes. As shown in FIG. 1, the pedals 22 are an example of a rotary power source which is operatively linked to a drive sprocket 24. The rear wheels 16 have a driven sprocket wherein the driven sprocket is linked to the drive sprocket 24 by a chain 26. Further, a derailleur assembly may be located at the rear wheel to allow for multiple gear selection, such that the driven sprocket would comprise several gears with various teeth. In addition, the rotary power source connected to the drive sprocket can be a motor or engine.

In one embodiment according to the present invention, the seating element 12 is a removable, interchangeable inflatable ball seat, although it is envisioned that other elements may be utilized. Other seating elements anticipated are various inflatable seats not forming the shape of a ball, by way of example and not limitation, a hemisphere. Further, while it is anticipated that the seating element will be filled with air, other conventionally known substances such as gel or foam padding may be used to inflate or otherwise fill the seating element.

The elongated frame member 18 has first end, a second end, a left side and a right side. The left side and right side extend longitudinally and are parallel with respect to each other and are designed to receive the bottom of the pneumatic ball seat and the seat retaining mechanism. The seat retaining mechanism 20 comprises a semi-rigid lower sling 40 and a circumscribing "belt" 42 that cinch the pneumatic ball seat 12 into the lower sling 40 against the seat back 44.

The seat retaining mechanism and its respective sling and belt can be shaped to secure and receive a hemispheric or other inflatable seat as well.

As shown in FIG. 1, the seat element is formed of a pneumatically inflated or inflatable, substantially spherical bladder or wall having a substantially spherical outer surface and a substantially spherical inner surface defining therewithin a spherical interior chamber when seat is inflated and in a state of rest in which it is substantially not compressed other than by its own weight when seated on a surface. Bladder or wall is typically formed of a rubber or elastomer which is flexible and stretchable while also being thick enough to support a user seated thereon during the operation of bike or trike. Further, this material withstands punctures from surround debris (i.e., rocks, pebbles encountered in an outdoor application).

Figure 2A:
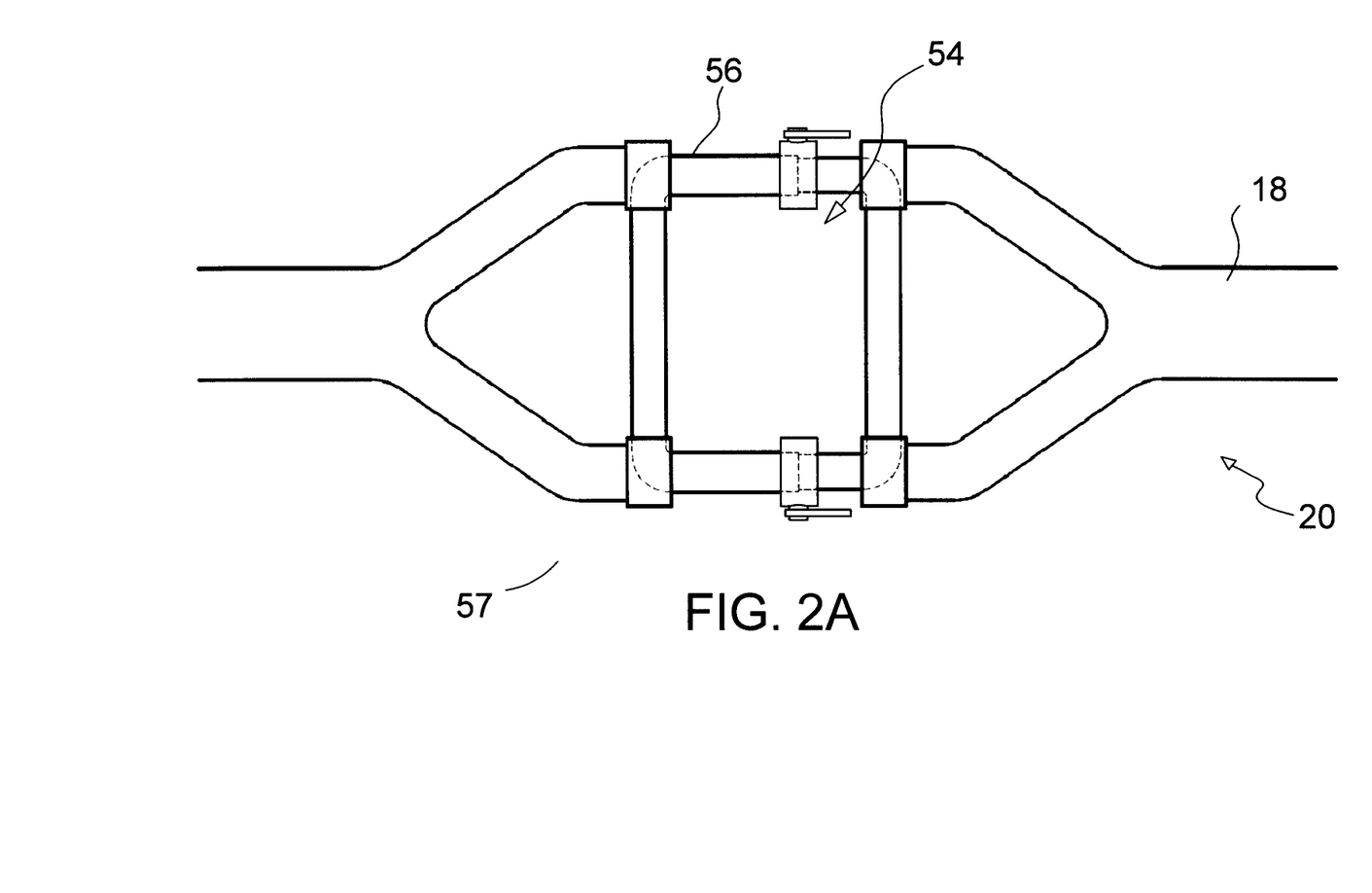
FIG. 2A is a partial detail top plan view of a frame track member for use in supporting a pneumatic seat element for use therewith shown in a retracted position.
Figure 2B:
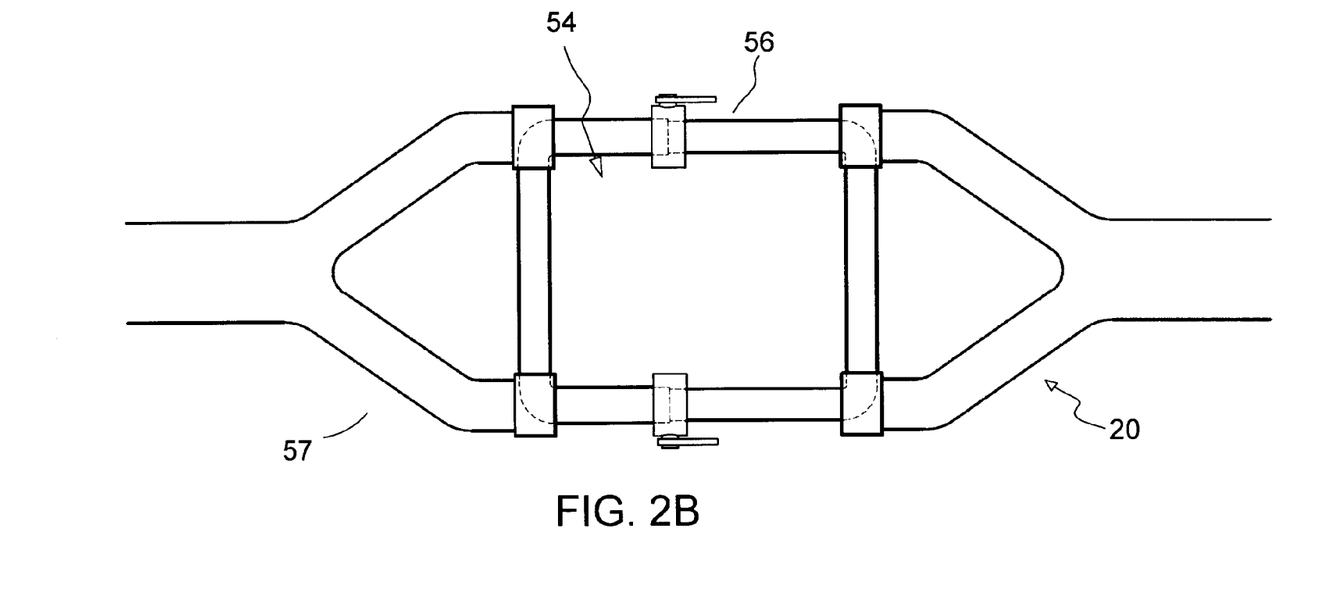
FIG. 2B is a partial detail top plan view of a frame track member for use in supporting a pneumatic seat element for use therewith shown in a retracted position.

FIGS. 2A and 2B are plan views of the seat retaining mechanism in combination with the frame 18 of the trike. When the inflated seat is mounted at rest on a frame 18 and housed within the seat retaining mechanism, a user of the bike or trike may ride the bike or trike in a conventional manner. In its operational configuration, an interior chamber is filled with a gas, which is most typically air. Thus, bladder or wall is formed of a material which is impermeable to air or any other gas used therein. The seat may or may not include an air inlet with a valve in order to allow the bladder to be inflated or deflated.

Further shown in FIG. 2A and FIG. 2B, when the seat element is inflated and in its resting state, the frame 18 is configured to receive the seat through top entrance opening and typically through a portion of front entrance opening, which together form an entrance opening 48 which extends generally upwardly and forward along intermediate segments and front segments. The seat 12 is thus inserted downwardly either substantially vertically or downwardly and rearwardly through entrance opening and a portion of opening until it is seated atop ball support. This downward or downward and rearward insertion of the sphere into space may or may not involve compression of the inflated seat against certain portions of arms. If such compression does occur, it is typically due to a sliding engagement between the outer surface of the sphere and the lower portions of front segments and/or support.

Once the seat 12 is properly positioned within the receiving space 48, the lower portions of front segments may abut the outer surface of the sphere in its resting state. The lower portions of front segments will generally prevent the ball from rolling forward out of space through front entrance opening. Although the ball might be forced horizontally forward out of space through front entrance opening, this would typically require a substantial amount of force in order to provide sufficient compression of the ball against and between segments to move through entrance opening. Generally, left and right rear entrance openings are configured so that at least one dimension of the respective entrance opening is sufficiently less than the diameter of the inflated ball in order to prevent it from moving through the respective entrance opening during use of the cycling apparatus.

Figure 3:
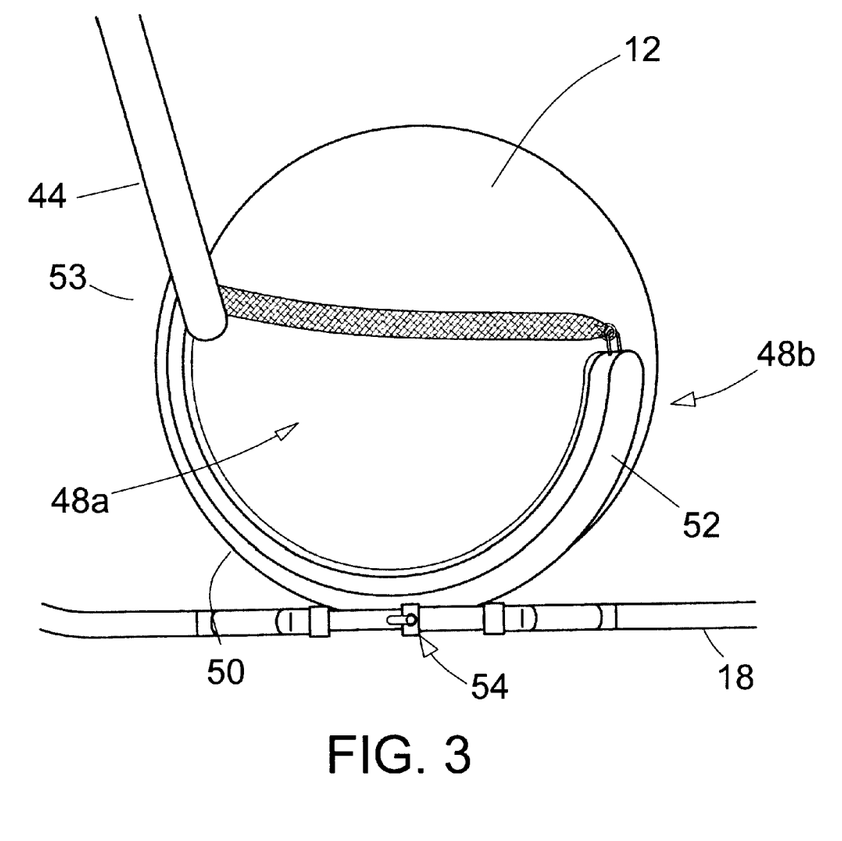
FIG. 3 is a section view of the seat securing means shown with an inflatable seat nested therewith according to the preferred embodiment of the present invention.

FIG. 3 show modified versions of the inflatable seat having a back support 44. The inflatable seat shown in FIG. 3 is substantially spherical although the bladder or wall is modified somewhat relative to that of a ball seat. A bladder includes a substantially spherical wall portion and a recessed wall portion which is secured to the bottom area of a wall portion and extends upwardly and inwardly therefrom. A recessed wall portion includes an annular side wall which is typically either cylindrical or frustoconical in shape although other shapes may be used, and a top wall secured to the top of an annular side wall. A side wall and top wall define therewithin a bottom recess having a bottom entrance opening which communicates with an outer surface of a spherical wall portion. A recessed wall portion thus projects inwardly into an interior chamber such that recess is circumscribed or entirely surrounded by the bottom portion of interior chamber extending radially outwardly from an annular side wall relative to a vertical axis passing through the center of recess. The outer surface of the bladder also has a diameter which is within the range as noted above with regard to the bladder.

2. Operation of the Preferred Embodiment

Figure 4:
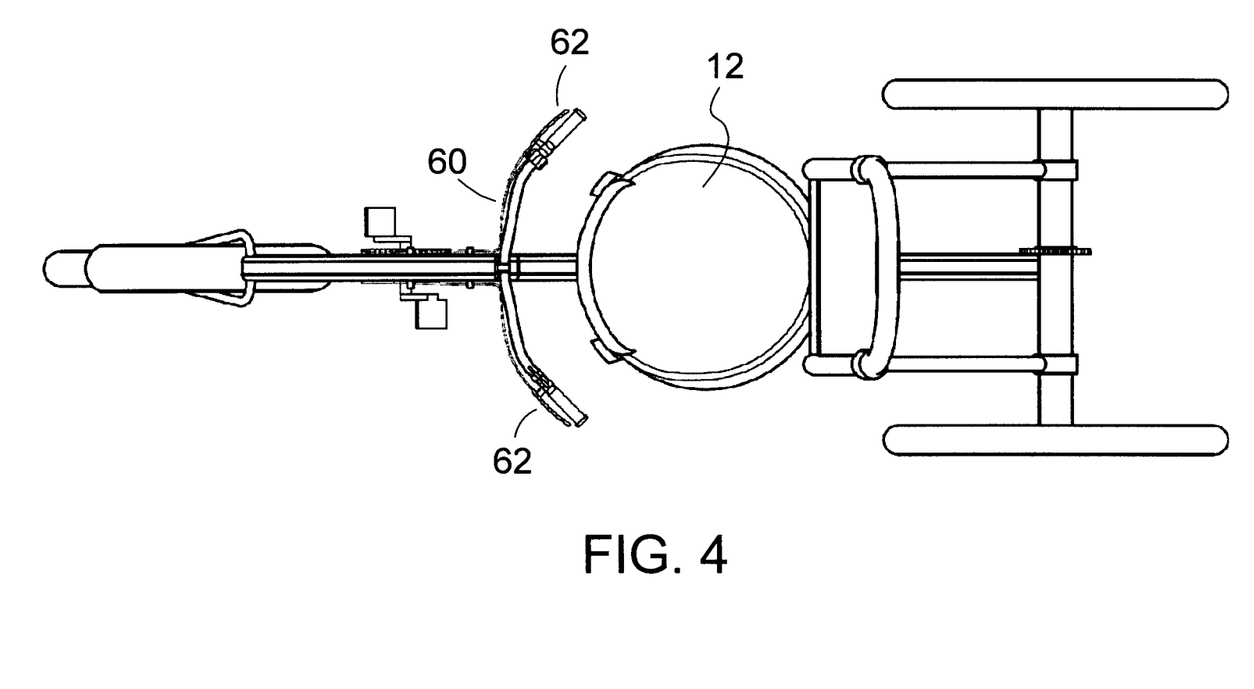
FIG. 4 is a top plan view of a second embodiment of a tricycle having the pneumatic seat element according to the preferred embodiment of the present invention.
Figure 5:
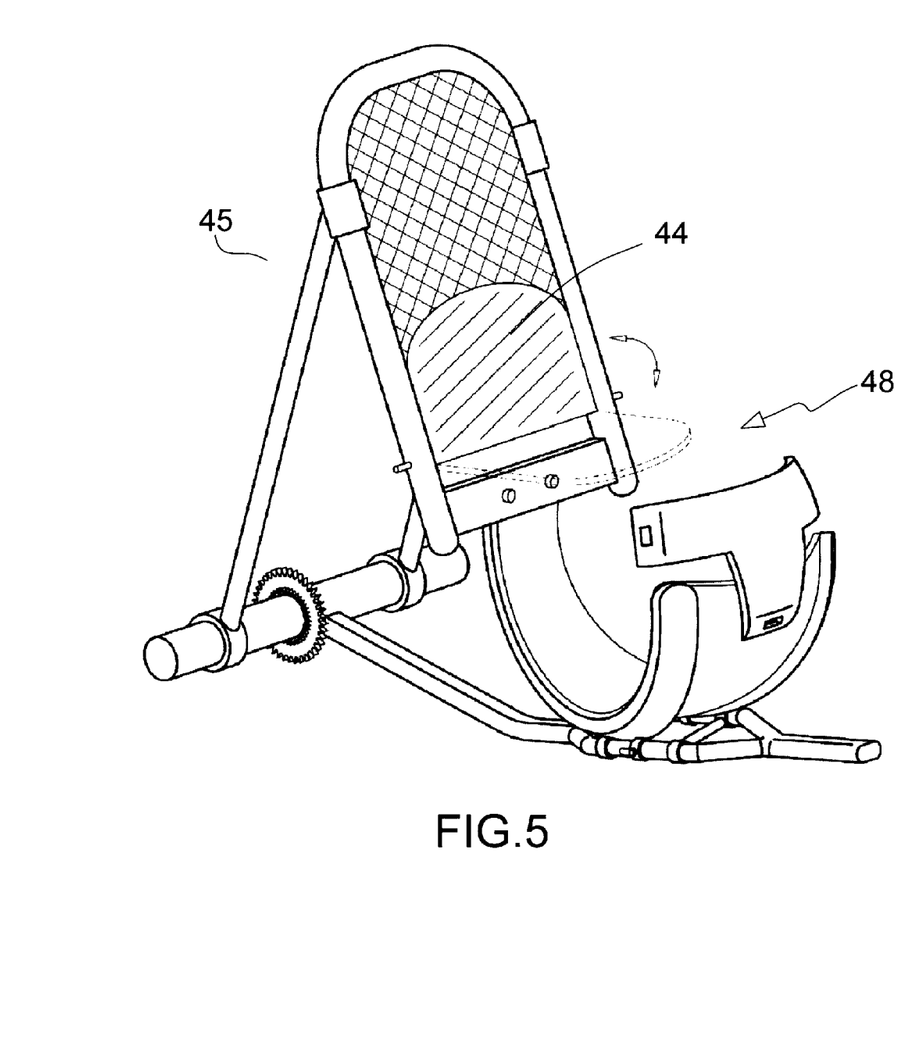
FIG. 5 is a section view of the seat securing means shown connected to a back support according to the preferred embodiment of the present invention.
Figure 6:
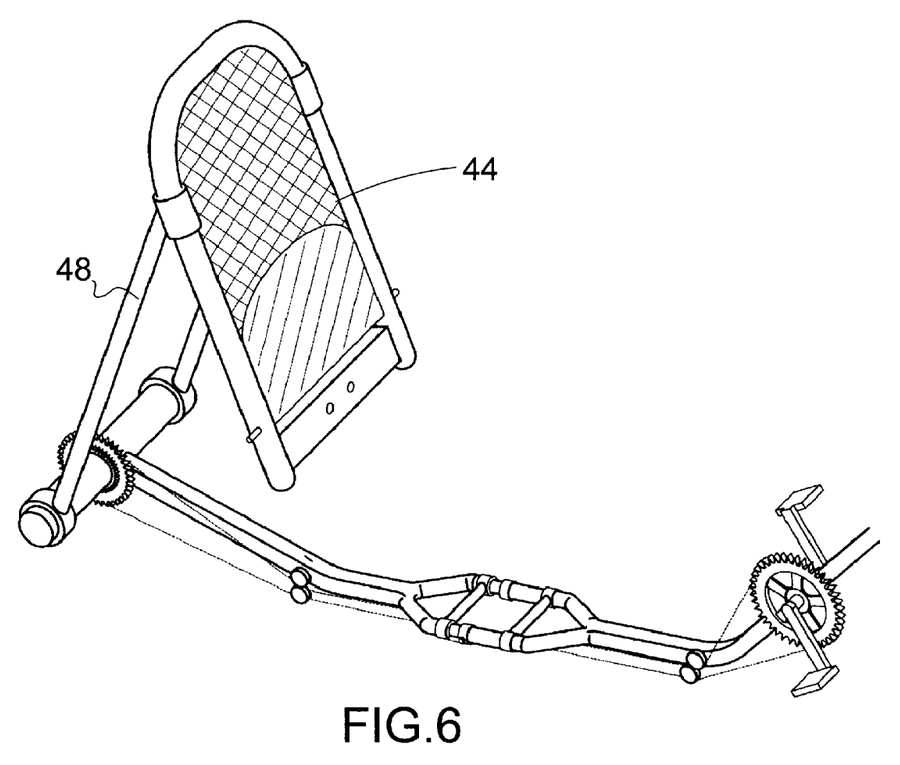
FIG. 6 is a perspective view of the crankshaft, gears, and powering mechanisms according to the preferred embodiment of the present invention.
Figure 7:
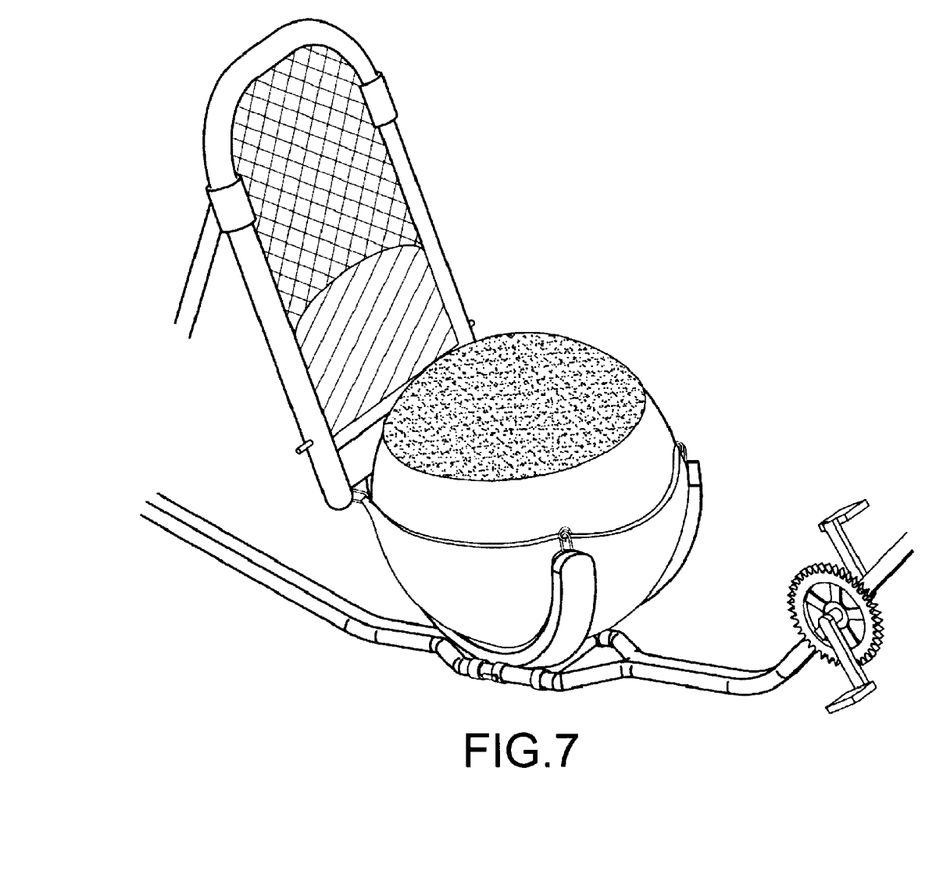
FIG. 7 is a front perspective view of the rear back support in connection to the frame and the derailleur assembly.
Figure 8:
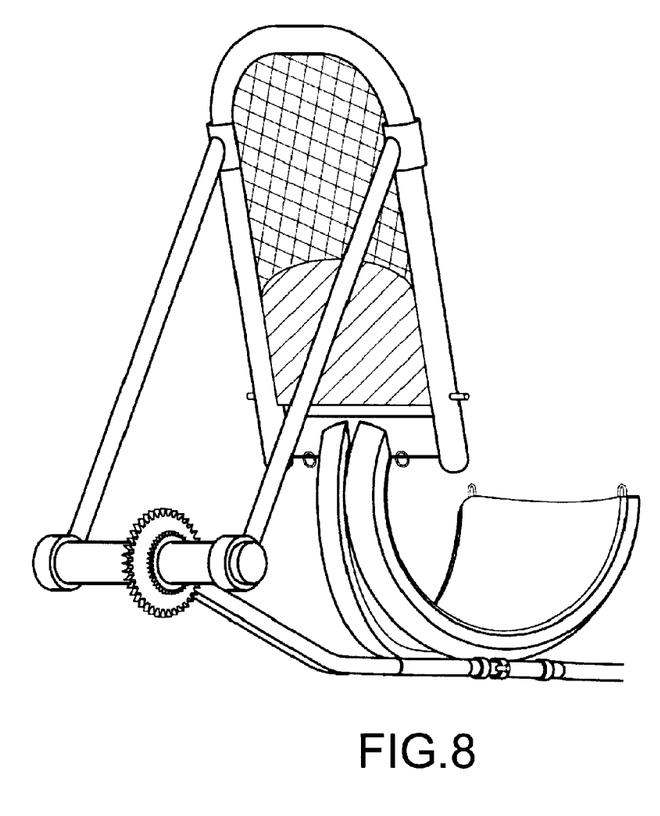
FIG. 8 is a rear perspective view of the rear back support in connection to the frame and the derailleur assembly.

The operation of the bike or trike is now described with primary reference to FIG. 4-8. As illustrated in FIG. 4, when the user or person sits down on a seating surface as illustrated in FIG. 4, the bladder is flexibly and stretchably deformed and compressed by the weight of the user such that the upper portion of bladder including seating surface moves downwardly. The user typically will sit atop the inflatable seat and begin pedaling the bike or trike. The user may hold on to handles while simultaneously grasping a set of brake levers operatively connected to brakes wherein the brakes are in communications with the tires. The bike or trike of the present invention provides a combination of a cardiovascular workout primarily via the pedaling of the bike along with a core workout primarily for the abdominal, back and hip muscles (muscles generally referred to as "core muscles") primarily via an inflatable seat. More particularly, the nature of inflatable seat means that seating surface does not remain stationary while the user's feet are applying force to pedals in order to pedal bike or trike. This movement of seating surface is primarily due to the inflatable aspect of the seat along with the flexible and stretchable material of which bladder is formed whereby the seating surface is able to move in any direction relative to the frame. Thus, a user is faced with the additional challenge of balancing on the seat while simultaneously pedaling the bike or trike. As a result, the user is forced to use abdominal muscles and back muscles to a substantially larger degree than would occur with a simple pedaling workout on a stationary seat.

The seat retaining mechanism is further described in FIG. 5 through FIG. 8 in combination with the back rest. The seat retaining mechanism is connected to a back rest. The back rest comprises a back rest frame in combination with a support, which could be padded, mesh or fabric material. A rear seat back support includes left and right rigid support members each of which in the exemplary embodiment is formed of a single elongated tube which is bent to form a front lower horizontal longitudinal segment, an arcuate back segment which curves upwardly and rearwardly from segment, and a straight upper segment which extends upwardly from an arcuate segment. More particularly, each arcuate segment has a lower front end which is secured to the rear end of horizontal segment at a lower connection or transition. The bottom end of each straight segment is secured to the top of each arcuate segment at an arcuate upper connection or transition which curves in the opposite direction of the segment. Each arcuate segment has a concavely curved front surface and a convexly curved back surface which curve parallel to one another and lie along arcs of respective circles which are concentric about the center of an inflated seat. However, other variations such as a frame with a padded support are anticipated. The back rest is supported by a support brace mounted at one end to the back rest frame and at the other end to the bike frame.

The seat retaining mechanism is operatively connected to the bike frame via a connection means. The connection means is at least one lever and lock that allow the seat retaining mechanism to slide or adjust relative to the bike or trike frame. This provides an adjustable length suitable for adapting to the size of any user.

The bike or trike frame further includes a rigid front elevated support which is rigidly secured to and extends upwardly from the front of a frame member and then rearwardly to a rear end. The frame further includes a rigid crank support assembly which supports various components as noted further below. The crank assembly includes a crank support bar which extends upwardly and rearwardly and an additional crank support bar which extends rearwardly and downwardly to a rigid connection with a support bar.

Rigid handle bars are secured to the front free end of the frame. Handle bars include left and right segments with left and right front-grip handles respectively secured to the terminal ends thereof. Handles typically include grips similar to the grips of handles, and thus are formed of like materials and may include heart rate or pulse sensors. Further attached to the handles is a gear shifting mechanism. It is noted that handle bars and/or handles may be mounted in a variety of ways in order to allow them to move between various positions as discussed above with regard to handle bars and handles.

Further attached to said handles is at least one brake lever. Said brake lever is operatively connected in a conventional manner to a conventional cycle braking system. Further, while the present invention has a lever braking system, other conventionally known braking systems, such as a coaster brake is anticipated.

When inflated the seat is mounted at rest on a frame, the bottom of the outer surface is seated on top surface of a plate or ball support, typically made of plastic, rubber or metal, as are portions of outer surface extending forward and upward therefrom to front edge and extending rearward and upward therefrom to back edge.

Generally, left and right rear entrance openings are configured so that at least one dimension of the respective entrance opening is sufficiently less than the diameter of the inflated ball in order to prevent it from moving through the respective entrance opening during use of the bike or trike. When the inflated ball seat is positioned at a state of rest in receiving space, most segments are at a height which is a little lower than the top of a ball although they may be slightly higher or at the same height.

An alternate embodiment of the present invention provides that an emergency solid seat may be attached to the bike or trike frame. This solid seat will effectively be a "back-up" plan should the inflatable seat fail by deflation or otherwise puncture. It is anticipated that the solid seat will be mounted to the frame proximate either to or underneath the seat receiving means or incorporated as part of or mounted to the back rest. This solid seat will allow a user to safely operate the trike or bike in the event the inflatable seat fails and until the inflatable seat can be repaired or replaced.

It will be evident to one skilled in the art that various alterations may be made which are within the scope of the present invention. For instance, the shape of the inflatable seat may vary beyond those illustrated in the figures. In addition, the mounting structures used to secure the inflatable seat to the frame may vary beyond those shown in the figures. While the seat of the invention has been described above as being inflated with air or another gas, it may also be a liquid filled seat which also allows for a substantial amount of flexibility of the bladder during operation. A gas-filled bladder is typically preferred inasmuch as it reduces the amount of weight while also minimizing the resistance to the flexible movement of the bladder compared to a liquid filled bladder. Further, the inflatable seat will be of a thickness and material that has a burst resistant property, conventionally known as a slow deflate ball, to provide a high quality texture and insure a resistance to rapid deflation resulting from a puncture. In addition, other seats may be configured to provide the substantial amount of multi-directional movement required to provide a workout of the user's core muscles during operation. For example, a gel seat or another seat formed of certain types of semisolid materials may be configured to provide the suitable type of movement to provide this core workout. Any of the inflatable seats may be used with or without a valve for controlling the inflation. An alternate pneumatic system may be provided which is not powered by the user, such as an electrically powered compressor which may or may not include a tank of compressed air.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as is suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A mobile cycle having a driving mechanism and a retained ball as a seat and further comprising:
    at least two wheels oriented in the same direction, connected to a frame having a front and a rear defining therebetween a longitudinal direction and a left side and a right sides defining there between an axial direction;
    a set of pedals operatively connected to said driving mechanism;
    a seat-receiving space defined by the frame rearwardly from the set of pedals;
    said ball as a seat is securely retained within a seat-receiving space and adapted for a user of the machine to sit on while the user's feet are on the pedals;
    said ball as a seat being inflatable;
    a top and a bottom of the frame;
    a seat back support of the frame which extends upwardly behind the inflatable seat;
    a first elongated arm which extends to the left of the seat;
    a second elongated arm which extends to the right of the seat;
    a first end of the first arm connected to the seat back support at a first connection;
    a second opposed end of the first arm connected to the frame adjacent the bottom at a second connection forward of and lower than the first connection;
    a first end of the second arm connected to the seat back support at a third connection; and
    a second opposed end of the second arm connected to the frame adjacent the bottom at a fourth connection forward of and lower than a third connection;

wherein a seat back is mounted on a seat back support, said first arm comprises a segment which forms an arc of a circle which lies along a left plane which angles upwardly and to the left; and the second arm comprises a segment which forms an arc of a circle which lies along a right plane which angles upwardly and to the right;

said left and right planes intersect at a line which angles upwardly and rearwardly;

said left and right arcuate arms secured to the frame and extending respectively to the left and right of the seat; wherein the left and right arms comprise respective rear segments, intermediate segments respectively connected to and extending forward from the rear segments, and front segments respectively connected to and extending downwardly from the intermediate segments.

2. The cycling apparatus of claim 1, further comprising a seat support on which inflatable seat in seated; and a portion of the seat support which flexes in response to downward force on the seat.

3. The movable cycle of claim 1, said cycle having three wheels.

4. The mobile cycle of claim 1, said cycle having four wheels.

5. The mobile cycle of claim 1, further comprising said seat back extending upwardly of and adjacent the inflatable seat and further adapted for resisting a user's back against while the user is seated on the inflatable seat.

6. The mobile cycle of claim 1, further comprising an emergency solid seat in connection with said cycle and capable of being engaged should said inflatable seat deflate.

7. The mobile cycle of claim 1 further comprising an air compressor in fluid communication with the inflatable seat.

* * * * *